United States Patent [19]
Guy et al.

[11] Patent Number: 5,727,662
[45] Date of Patent: Mar. 17, 1998

[54] THERMAL EXPANSION COMPENSATION DEVICE FOR SHOCK ABSORBERS

[75] Inventors: Yoram Guy, Ann Arbor; John S. Pipis, Jr., Monroe, both of Mich.

[73] Assignee: Monroe Auto Equipment Company, Monroe, Mich.

[21] Appl. No.: 596,992

[22] Filed: Feb. 5, 1996

[51] Int. Cl.⁶ .................. F16F 9/18; F16F 9/36; F16F 9/34
[52] U.S. Cl. .................. 188/315; 188/276; 188/322.14; 188/322.19
[58] Field of Search .................. 188/315, 316, 188/322.19, 322.14, 276, 277, 322.17, 322.11

[56] References Cited

U.S. PATENT DOCUMENTS

| | | | |
|---|---|---|---|
| 3,211,444 | 10/1965 | Avner | 188/315 |
| 3,592,164 | 7/1971 | Schultze | |
| 3,659,684 | 5/1972 | Porter | 188/315 |
| 3,865,356 | 2/1975 | Wossner | |
| 3,958,672 | 5/1976 | Keilholz | |
| 4,131,266 | 12/1978 | Carter | 188/315 |
| 4,423,800 | 1/1984 | Kobiske et al. | |
| 4,828,237 | 5/1989 | Neff | 188/321.11 |
| 4,955,460 | 9/1990 | Lizell et al. | |
| 5,148,897 | 9/1992 | Vanroye | |
| 5,150,886 | 9/1992 | Hamberg et al. | |
| 5,263,694 | 11/1993 | Smith et al. | |
| 5,320,169 | 6/1994 | Delatorre | |
| 5,325,942 | 7/1994 | Groves et al. | |
| 5,441,132 | 8/1995 | Pradel et al. | 188/315 |
| 5,638,927 | 6/1997 | Cheatham et al. | 188/322.19 |

FOREIGN PATENT DOCUMENTS 3817840  12/1989  Germany ............... 188/322.19

*Primary Examiner*—Douglas C. Butler
*Attorney, Agent, or Firm*—Harness, Dickey & Pierce

[57] ABSTRACT

A shock absorber has a biasing member located between the base cup of a reserve tube and a cylinder end at the bottom of a pressure tube. The biasing member urges the pressure tube away from the base cup of the reserve tube and provides for movement between the lower ends of the two members without affecting the seating or sealing of the components within the shock absorber. The movement between the pressure tube and the reserve tube provides axial compliance for accommodating tubes materials having different materials with different coefficients of thermal expansion.

19 Claims, 3 Drawing Sheets

THERMAL EXPANSION COMPENSATION DEVICE FOR SHOCK ABSORBERS

FIELD OF THE INVENTION

The present invention relates generally to suspension systems for motor vehicles and machines which receive mechanical shock. More particularly, the present invention relates to a shock absorber which incorporates a compliant cylinder end assembly which compensates for the different thermal expansion between the pressure tube and the reserve tube.

BACKGROUND OF THE INVENTION

Hydraulic dampers, such as shock absorbers, are used in connection with motor vehicle suspension systems to absorb unwanted vibrations which occur during the operation of the motor vehicle. The unwanted vibrations are dampened by shock absorbers which are generally connected between the sprung portion (i.e. the vehicle body) and the unsprung portion (i.e. the suspension) of the motor vehicle. A piston assembly is located within the compression chamber of the shock absorber and is usually connected to the body of the motor vehicle through a piston rod. The piston assembly includes a valving arrangement that is able to limit the flow of damping fluid within the compression chamber when the shock absorber is compressed or extended. As such, the shock absorber is able to generate a damping force which "smooths" or "dampens" the vibrations transmitted between the suspension and the vehicle body.

A conventional prior art twin tube shock absorber 10 is shown in FIG. 1 and comprises a piston rod assembly 12, a pressure tube assembly 14, and a reserve tube 16. Piston rod assembly 12 is disposed within pressure tube assembly 14 and includes a piston rod 18 having an adaptor 20 at one end which extends out of pressure tube assembly 14 for connection to the motor vehicle. The opposite end of piston rod 18 is attached to a piston valve 22 which is slidably received within pressure tube assembly 14. Pressure tube assembly 14 comprises a pressure tube 24 having a rod guide 26 located at one end and a base valve 28 located at the opposite end. Rod guide 26 slidingly receives piston rod 18 and usually includes a rod bearing 30 disposed between rod guide 26 and piston rod 18 for sealingly engaging piston rod 18. Base valve 28 controls the flow of fluid between a compression chamber 31 defined by pressure tube 24 and a reservoir 32 defined by reserve tube 16. Reservoir 32 coaxially surrounds pressure tube 24 and extends between base valve 28 and rod guide 26. Reserve tube 16 includes a fitting 34 which facilitates the connection of tube 16 to the motor vehicle.

Damping characteristics are controlled by orifices in piston valve 22 and base valve 28 which regulate passage of fluid from one side of piston valve 22 to the other and from compression chamber 31 to reservoir 32. Due to the presence of piston rod 18 on only one side of piston valve 22, the volume of hydraulic fluid which must be displaced on the compression stroke is different from the volume of hydraulic fluid which must be displaced on the rebound stroke. This difference in volume is called the rod volume and it is compensated for by base valve 28 and reservoir 32. The rod volume of hydraulic fluid is throttled out of compression chamber 31 during the compression stroke through base valve 28 into reservoir 32. During the rebound stroke, the rod volume of hydraulic fluid enters compression chamber 31 through base valve 28.

The continued movement of piston rod 18 and piston valve 22 back and forth within pressure tube 24 causes the rod volume of oil to be correspondingly throttled into and out of reservoir 32 through base valve 28. Thus, only a portion of the hydraulic fluid in reservoir 32 is effectively utilized. The remainder of hydraulic fluid within reservoir 32 remains relatively static. This quick exchange of hydraulic fluid through base valve 28 and piston valve 22 as well as the friction between piston valve 22 and pressure tube 24 and the friction between piston rod 18 and rod guide 26 generates heat which is undesirable during prolonged operating conditions.

In addition to absorbing the heat generated while providing the damping function for the motor vehicle, shock absorber 10 is also required to operate over a broad range of temperatures ranging from severe cold temperatures of the winter months to the extremely hot temperatures of the summer months. Prior art shock absorbers are manufactured using steel for pressure tube 24 and reserve tube 16. While steel been proven to be an acceptable material for these components, tubes manufactured from aluminum offer the advantages of weight savings as well as improved heat dissipation. If the typical pressure tube 24 were manufactured from steel while reservoir tube 16 were manufactured from aluminum, the difference in their relative axial thermal expansion rates may present problems for the shock absorber when operating over the necessary temperature extremes. Specifically, structural failure may occur under extreme cold temperatures or loss of pressure tube preload and sealing may occur under extreme hot temperatures.

Accordingly, continued development of shock absorbers with aluminum tubes includes the development of methods to compensate for differing axial thermal expansion between aluminum and steel as well as the differing thermal expansion between any other two materials.

SUMMARY OF THE INVENTION

The present invention provides the art with a shock absorber which incorporates a compliant cylinder end assembly which is capable of compensating for the differing thermal expansion between two materials and thus eliminating the possibility of structural failure due to extreme cold temperatures as well as the possibility of pressure tube preload loss and sealing failure under extreme hot temperatures.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
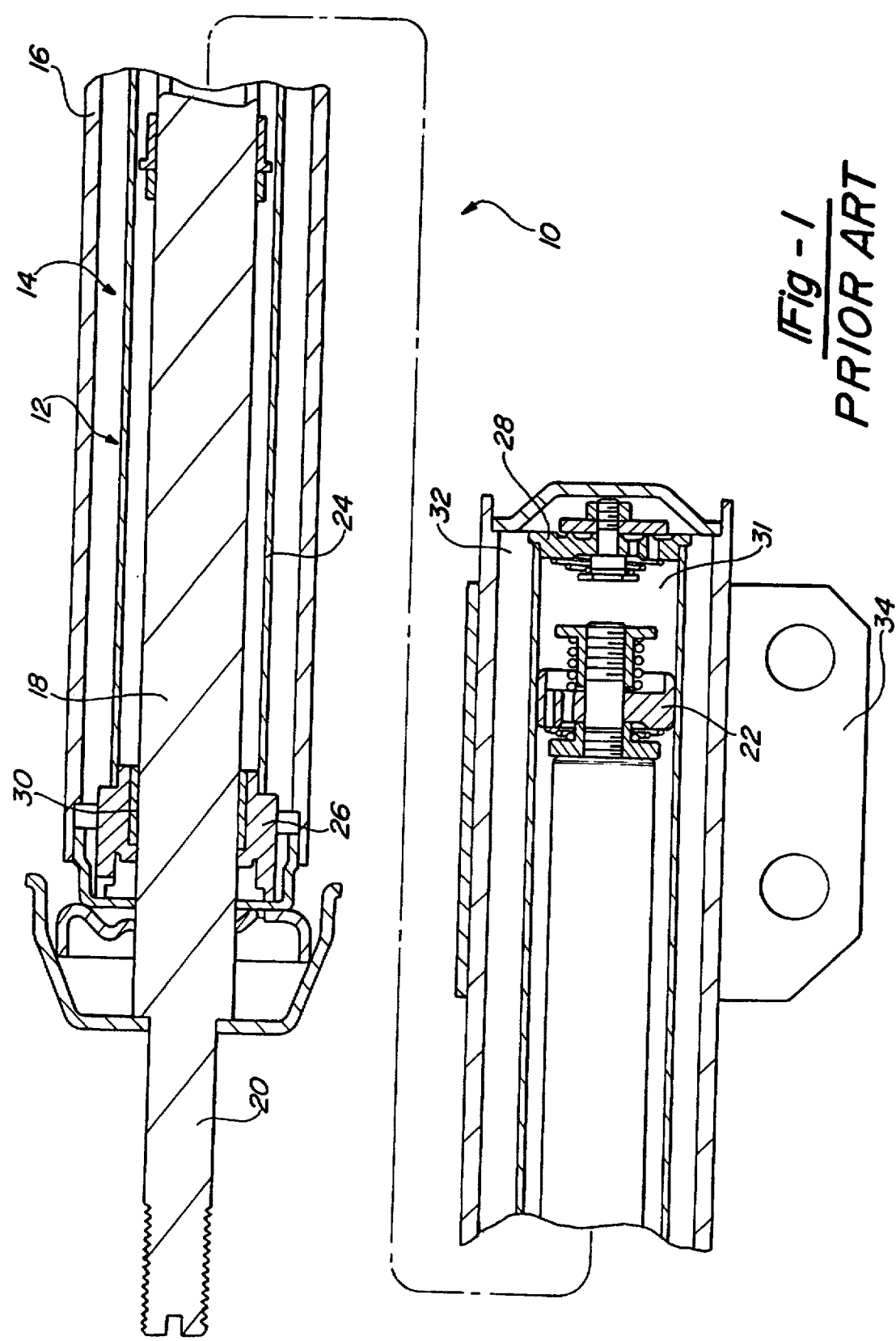
FIG. 1 is a longitudinal cross-sectional view through a prior art shock absorber.
Figure 2:
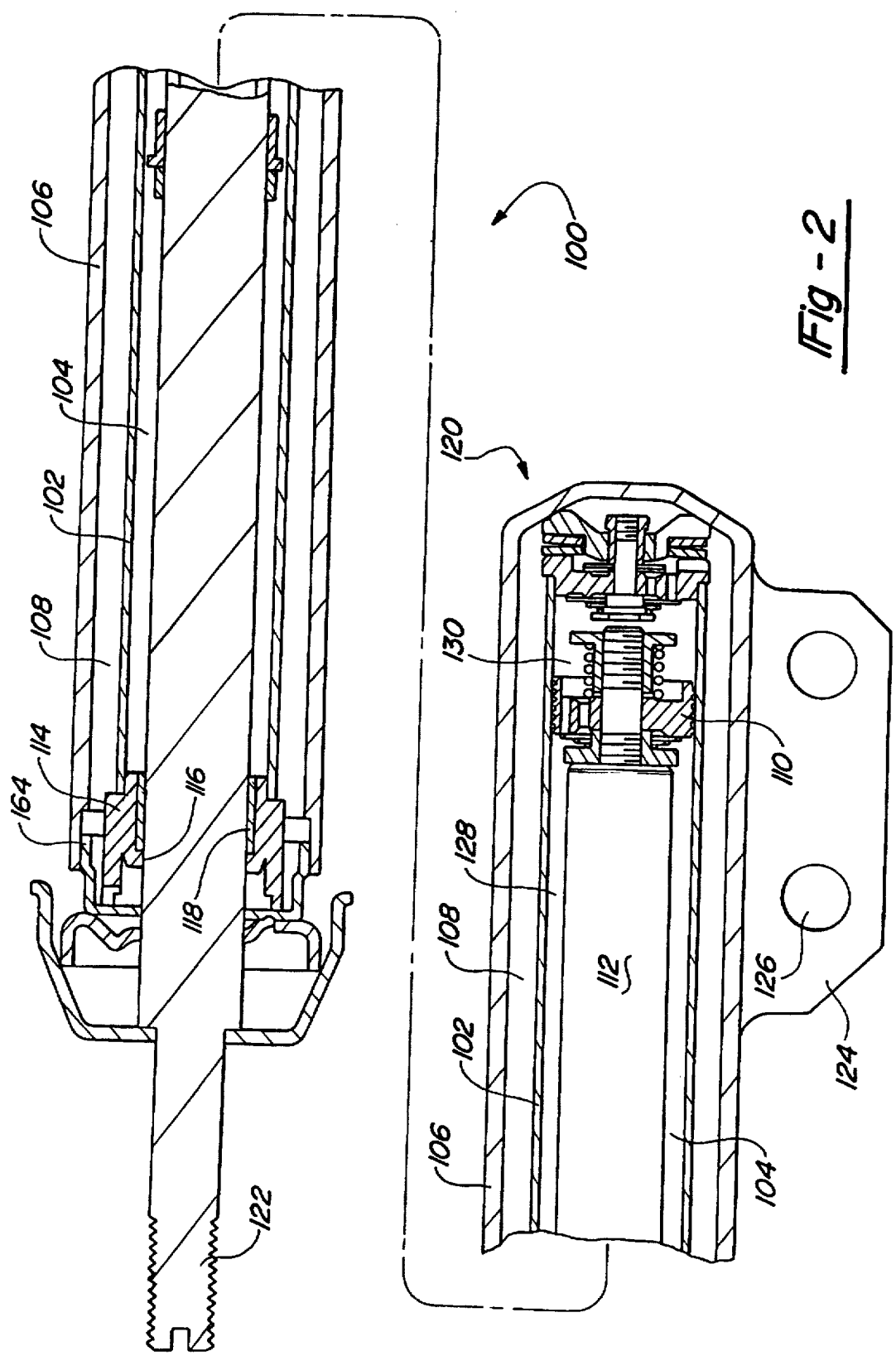
FIG. 2 is a longitudinal cross-sectional view through a shock absorber incorporating the unique compliant cylinder end assembly in accordance with the present invention.

Referring now to the drawings in which like reference numerals designate like or corresponding parts throughout the several views, there is shown in FIG. 2 a shock absorber incorporating a unique compliant cylinder end assembly in accordance with the present invention which is designated generally using reference numeral 100. Shock absorber 100 comprises an elongated pressure tube 102 provided for defining a hydraulic fluid containing compression chamber 104 and an elongated reserve tube 106 provided for defining a hydraulic fluid containing reservoir 108. It is to be understood that the construction of shock absorber 100 is merely exemplary in nature and is only intended to illustrate one type of hydraulic damping apparatus within which the unique compliant cylinder end assembly of the present invention can be utilized.

Disposed within compression chamber 104 is a reciprocal piston assembly 110 that is secured to one end of an axially extending piston rod 112. Piston rod 112 is supported and guided for movement within pressure tube 102 by means of a combination seal and rod guide assembly 114 located at the upper end of pressure tube 102 and having a centrally extending bore 116 through which piston rod 112 is reciprocally movable. Disposed within bore 116 between rod guide assembly 114 and piston rod 112 is a bushing 118 which is used to facilitate movement of piston rod 112 with respect to rod guide assembly 114.

A unique compliant cylinder end assembly, generally designated at 120, is located at the lower end of pressure tube 102 and functions to control the flow of hydraulic fluid between compression chamber 104 and fluid reservoir 108 as well as to compensate for the differing axial thermal expansion between the various components of shock absorber 100 as will be described later herein. Fluid reservoir 108 is defined as the space between the outer peripheral surface of pressure tube 102 and the inner peripheral surface of reserve tube 106.

The upper and lower ends of shock absorber 100 are adapted for assembly into a motor vehicle. Piston rod 112 is shown having a threaded portion 122 for securing the upper end of shock absorber 100 to the motor vehicle while reserve tube 106 is shown incorporating a flange 124 having a pair of mounting holes 126 for securing the lower end of shock absorber 100 to the motor vehicle (McPherson strut configuration). While shock absorber 100 is shown in a McPherson strut configuration having threaded portion 122 and flange 124 for securing it between the sprung and unsprung portions of the motor vehicle, it is to be understood that this is merely exemplary in nature and is only intended to illustrate one type of system for securing shock absorber 100 to the motor vehicle. As will be appreciated by those skilled in the art, upon reciprocal movement of piston rod 112 and piston assembly 110, hydraulic fluid within compression chamber 104 will be transferred between an upper portion 128 and a lower portion 130 of compression chamber 104 as well as between compression chamber 104 and fluid reservoir 108 through compliant cylinder end assembly 120 for damping relative movement between the sprung portion and the unsprung portion of the motor vehicle.

The present invention is directed toward the unique compliant cylinder end assembly 120 which controls the flow of hydraulic fluid between compression chamber 104 and reservoir 108 as well as compensates for the differing axial thermal expansion between pressure tube 102 and reserve tube 106. The compensating ability of compliant cylinder end assembly 120 eliminates the possibility of structural failure, pressure tube 102 preload loss and sealing failure under the temperature extremes experienced by shock absorber 100.

Figure 3:
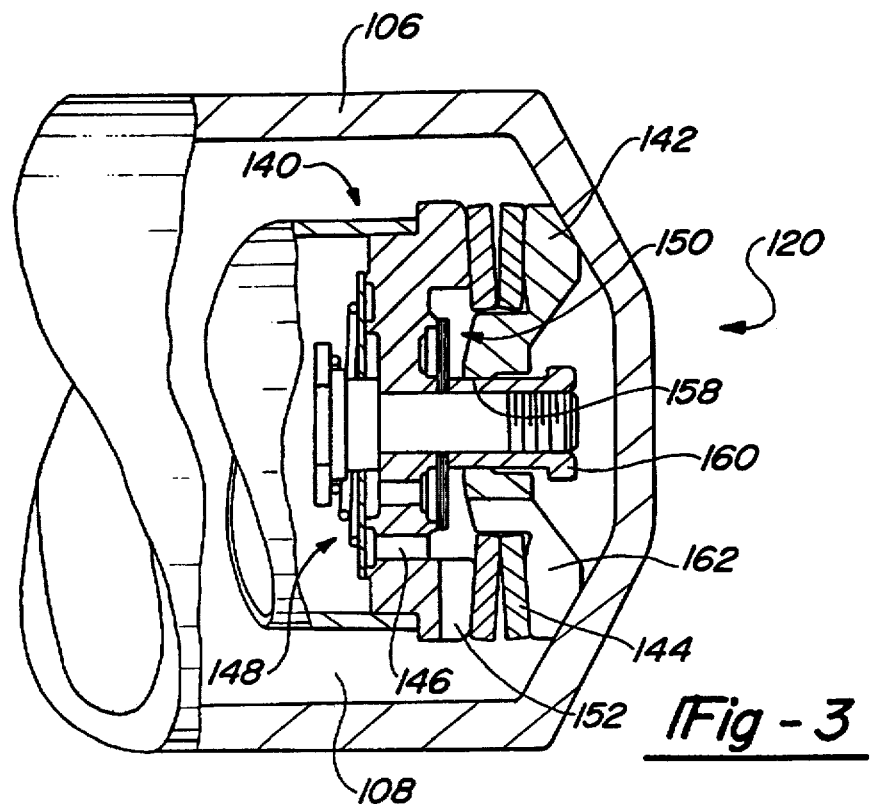
FIG. 3 is an enlarged cross-sectional view illustrating the unique compliant cylinder end assembly in accordance with the present invention.

Referring now to FIG. 3, compliant cylinder end assembly 120 comprises a cylinder end assembly 140, a stand-off 142 and a plurality, an even number in the preferred embodiment, of Belleville springs 144 disposed between cylinder end assembly 140 and stand-off 142. Cylinder end assembly 140 includes a typical base valve assembly having a plurality of flow passages 146, compression valve 148 and intake valve 150 and optionally a differing reserve volume flow routing 152. Coil spring clamps close intake valve 148 and bolt tension (preload force) clamps close compression valve 150. The operation of cylinder end assembly 140 is identical to the operation of the prior art base valve and thus will not be discussed further herein.

Stand-off 142 defines an internal bore 158 which slidingly receives a nut 160 such that cylinder end assembly 140 and stand-off 142 are capable of moving axially with respect to each other. Internal bore 158 is sized to be smaller than the head of nut 160 thereby allowing nut 160 to maintain the assembly of Belleville springs 144 and stand-off 142. The plurality, preferably an even number, of Belleville springs 144 are disposed between cylinder end assembly 140 and stand-off 142 to bias cylinder end assembly 140 away from stand-off 142. The outside diameter of stand-off 142 is sized to slidingly receive the inside diameter of Belleville springs 144 in order to radially locate Belleville springs 144. Stand-off 142 is disposed within reservoir 108 such that it abuts the closed end of reserve tube 106. An optional differing reserve volume flow routing 162 extends through stand-off 142 to provide for part or all of the flow of hydraulic oil between pressure tube 102 and reservoir 108.

Referring now to FIG. 2, the assembly of pressure tube 102, piston assembly 110, piston rod 112, rod guide assembly 114 and compliant cylinder end assembly 120 is inserted into reserve tube 106 and an axial preload is applied to rod guide assembly 114 which acts through pressure tube 102, through compliant cylinder end assembly 120 and against the closed end of reserve tube 106 to deflect or compress Belleville springs 144 by a specified amount. When the specified amount of compression of Belleville springs 144 is reached, the open end of reserve tube 106 is closed by any one of the well known prior art methods at 164 to secure the assembly together. Once assembled, the difference in axial thermal expansion between the aluminum reserve tube 106 and the steel pressure tube 102 is compensated for by the increase or decrease in the compression of Belleville springs 144. The allowed movement between pressure tube 102 and reserve tube 106 provides axial compliance between the two components having different coefficients of thermal expansion without affecting the sealing between the components within the shock absorber. Thus, it is possible to use an aluminum reserve tube 106 for weight savings and improved heat dissipation while using a steel pressure tube 102 for wear resistance and low hoop strain without experiencing the various problems associated with utilizing two components having different coefficients of thermal expansion.

The present invention, by orienting Belleville springs 144 in the zig-zag manner shown in FIG. 3, enables the transmission of axial loads between the closed end of reserve tube 106 and cylinder end assembly 140 in substantially the same respective locations or diameters as in the prior art shock absorber thus minimizing the bending stress on both cylinder end assembly 140 and stand-off 142. The configuration of the present invention provides simplified manipulation and assembly because the plurality of Belleville springs 144 and stand-off 142 are assembled together with cylinder end assembly 140 and retained on cylinder end assembly 140 by nut 160. The present invention may be incorporated into a standard shock absorber by making a small length change on either the pressure tube or the reserve tube without having to modify piston assembly 110, rod guide assembly 114 or piston rod 112. In addition, the configuration of the present invention allows room within the assembly for a wide variety of Belleville springs 144 because the inside diameter of the Belleville springs 144 can be as small as the outside diameter of nut 160.

Figure 4:
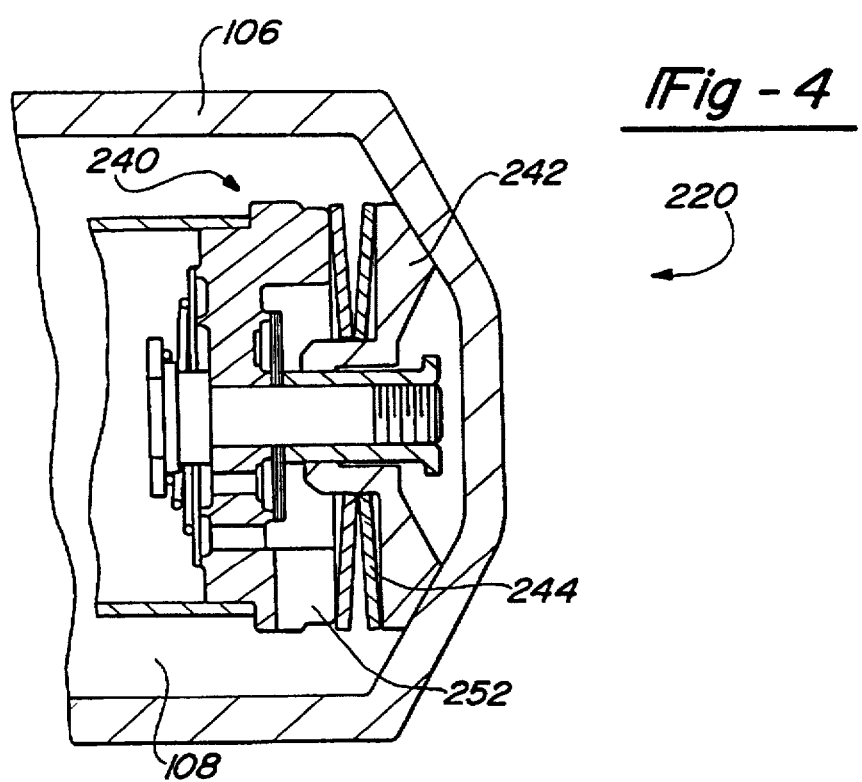
FIG. 4 is an enlarged cross-sectional view similar to FIG. 3 but illustrating a unique compliant cylinder end assembly in accordance with another embodiment of the present invention.

FIG. 4 illustrates a compliant cylinder end assembly 220 according to another embodiment of the present invention. Compliant cylinder end assembly 220 comprises a cylinder end assembly 240, a stand-off 242 and a plurality, an even number in the preferred embodiment, of Belleville springs 244. Belleville springs 244 are similar Belleville springs 144 except Belleville springs 244 can have a lower spring rate than Belleville springs 144 due to their higher than standard OD/ID ratio and the thinner gage material used to manufacture them. Cylinder end assembly 240 and stand-off 242 are similar to cylinder end assembly 140 and stand-off 142 with the exception of the differing optional reserve volume flow routing and the hub diameter of stand-off 242. Stand-off 242 has a reduced hub diameter in order to accommodate Belleville springs 244 which have a smaller inside diameter than Belleville springs 144. This smaller hub diameter discourages the incorporation of a differing reserve volume flow routing through stand-off 242 similar to flow routing 162 in stand-off 142. In order to provide a sufficiently sized route for the reserve volume flow, cylinder end assembly 240 incorporates differing reserve volume flow routing 252 which is larger than flow routing 152 of cylinder end assembly 140, which can use parallel flow routing 162.

While the above detailed description describes the preferred embodiment of the present invention, it should be understood that the present invention is susceptible to modification, variation and alteration without deviating from the scope and fair meaning of the subjoined claims.

What is claimed is:

1. A shock absorber which compensates for thermal expansion, said shock absorber comprising:
    a pressure tube forming a compression chamber;
    a piston slidably disposed within said compression chamber;
    a piston rod connected to said piston;
    a reserve tube disposed around said pressure tube, said reserve tube and said pressure tube defining a fluid reservoir;
    a cylinder end assembly disposed between said compression chamber and said fluid reservoir for controlling the flow of fluid between said compression chamber and said fluid reservoir;
    a stand-off defining an internal bore for receiving a connecting member to slidably connect said stand-off to said cylinder end assembly; and
    a biasing member disposed between said reserve tube and said pressure tube for urging said pressure tube away from said reserve tube, thereby allowing axial thermal expansion between said pressure tube and said reserve tube.

2. The shock absorber according to claim 1 wherein, said biasing member comprises at least one Belleville spring.

3. The shock absorber according to claim 2 wherein, said at least one Belleville spring is an even number of Belleville springs stacked in a zig-zag fashion.

4. The shock absorber according to claim 1 wherein, said biasing member is disposed between said cylinder end assembly and said reserve tube.

5. The shock absorber according to claim 4 wherein, said biasing member comprises at least one Belleville spring.

6. The shock absorber according to claim 1 wherein, said biasing member is disposed between said stand-off and said cylinder end assembly.

7. The shock absorber according to claim 6 wherein, said internal bore slidably receives a nut whereby said cylindrical end assembly and said stand-off are capable of moving axially with respect to one another.

8. The shock absorber according to claim 6 wherein, said stand-off includes a stepped hub having a diameter sized to slidably receive said biasing member.

9. The shock absorber according to claim 1 wherein, said stand-off is a rigid member.

10. The shock absorber according to claim 1 wherein, said stand-off, said biasing member and said cylindrical end assembly form an assembly whereby said biasing member and said stand-off are retained on said cylindrical end assembly by said connecting member.

11. A shock absorber which compensates for thermal expansion, said shock absorber comprising:
    a pressure tube symmetrically disposed about an axis, said pressure tube forming a compression chamber having upper and lower portions;
    a piston slidably disposed between and separating said upper and lower portions of said compression chamber, said piston allowing restricted flow of hydraulic fluid between said upper and lower portions of said compression chamber;
    a piston rod having a first and a second end, said first end being connected to said piston, said second end extending along said axis of said pressure tube through said upper portion of said compression chamber and out one end of said pressure tube;
    a reserve tube disposed around said pressure tube, said reserve tube and said pressure tube cooperating to define a hydraulic fluid reservoir;
    a cylinder end assembly disposed between said lower portion of said compression chamber and said fluid reservoir, said cylinder end assembly allowing the flow of hydraulic fluid between said compression chamber and said fluid reservoir;
    a stand-off slidably connected to said cylinder end assembly and disposed between said lower portion of said compression chamber and said fluid reservoir; and
    a biasing member disposed between said cylinder end assembly and said stand-off adjacent to said lower portion of said compression chamber, said biasing member urging said pressure tube away from said reserve tube, thereby allowing axial thermal expansion between said pressure tube and said reserve tube.

12. The shock absorber according to claim 11 wherein, said biasing member comprises at least one Belleville spring.

13. The shock absorber according to claim 12 wherein, said at least one Belleville spring is an even number of Belleville springs stacked in a zig-zag fashion.

14. The shock absorber according to claim 11 further comprising a stand-off disposed between said reserve tube and said cylinder end assembly, said biasing member being disposed between said stand-off and said cylinder end assembly.

15. The shock absorber according to claim 11 wherein, said stand-off defines an internal bore for receiving a connecting member to slidably connect said stand-off to said cylindrical end assembly and a stepped hub sized to slidably receive said biasing member.

16. The shock absorber according to claim 11 wherein, said stand-off includes an outer cylindrical sidewall having a first diameter and a cylindrical stepped hub having a second diameter, said second diameter being smaller than said first diameter whereby said biasing member is sized to be slidably received substantially between said first diameter and said second diameter.

17. A shock absorber which compensates for thermal expansion, said shock absorber comprising:

a piston tube forming a compression chamber;

a piston slidably disposed within said compression chamber;

a piston rod connected to said piston;

a reserve tube disposed around said pressure tube, said reserve tube and said pressure tubes defining a fluid reservoir;

a cylinder end assembly disposed between said compression chamber and said fluid reservoir;

a stand-off slidably connected to said cylinder end assembly with a connecting member, said stand-off having a stepped hub to slidably receive a biasing member; and said biasing member urging said cylinder end assembly away from said stand-off, thereby allowing axial thermal expansion between said reserve tube and said pressure tube.

18. The shock absorber according to claim 17 wherein, said biasing member is at least one Belleville spring.

19. The shock absorber according to claim 17 wherein, said stand-off includes an outer cylindrical sidewall and defines a concentric internal bore, said connecting member including a nut which is slidably received by said internal bore, said nut including a head, said internal bore sized to be smaller than said head, whereby permitting said nut to slidably secure said stand-off to said cylinder end assembly.

* * * * *